Sept. 20, 1966    S. H. BEHR    3,274,489
CABLE FAULT LOCATOR FOR UNGROUNDED ELECTRICAL SYSTEMS
INCLUDING MEANS FOR APPLYING A SQUARE WAVE
TO THE CABLE UNDER TEST
Filed Jan. 20, 1964    3 Sheets-Sheet 1

INVENTOR.
SAMUEL H. BEHR
BY Ernest J Weinberger
Max D Farmer
ATTORNEYS

Sept. 20, 1966   S. H. BEHR   3,274,489
CABLE FAULT LOCATOR FOR UNGROUNDED ELECTRICAL SYSTEMS
INCLUDING MEANS FOR APPLYING A SQUARE WAVE
TO THE CABLE UNDER TEST
Filed Jan. 20, 1964   3 Sheets-Sheet 2

INVENTOR.
SAMUEL H. BEHR
BY Ernest J Weinberger
Max A Farmer
ATTORNEYS

Sept. 20, 1966 S. H. BEHR 3,274,489
CABLE FAULT LOCATOR FOR UNGROUNDED ELECTRICAL SYSTEMS
INCLUDING MEANS FOR APPLYING A SQUARE WAVE
TO THE CABLE UNDER TEST
Filed Jan. 20, 1964 3 Sheets-Sheet 3

INVENTOR.
SAMUEL H. BEHR
BY Ernest F Wernberger
Max A Farmer
ATTORNEYS

United States Patent Office 3,274,489
Patented Sept. 20, 1966

3,274,489
CABLE FAULT LOCATOR FOR UNGROUNDED ELECTRICAL SYSTEMS INCLUDING MEANS FOR APPLYING A SQUARE WAVE TO THE CABLE UNDER TEST
Samuel H. Behr, 1046 Pembroke St., Uniondale, N.Y.
Filed Jan. 20, 1964, Ser. No. 339,037
4 Claims. (Cl. 324—52)

The invention described herein may be manufactured and used by or for the Government of the United States of America for governmental purposes without the payment of any royalties thereon or therefor.

This invention relates to instrumentation and methods for the determination of faults existing in power line system and more particularly to the location of ground faults in an ungrounded electrical system, as, for example, those distribution systems employed aboard ships.

Ship service electrical power systems are normally operated ungrounded and when one of these lines becomes grounded it is immediately necessary to locate and rectify the condition. Although there will be no interruption of electrical service due to the grounding of one line, this condition presents a hazard to the personnel involved. These grounds generally occur for many and varied reasons, the most common, however, being worn or defective insulation. Generally, the determination of the precise location of the ground requires considerable expenditure of both time and effort in addition to necessitating the inactivation of certain electrically powered equipment. That is the most common present procedure for locating grounds after detection requires successive de-energization of various circuits and portions of the electrical system in order to localize the ground before its precise location is ascertained. Since certain apparatus cannot be inactivated at any particular time, it is sometimes necessary that the location of a ground be deferred until such time as de-energization is practicable. During the period in which the ground does exist for a multiphase power system, a phase to phase voltage appears between each of the ungrounded phases and the ground thereby increasing both the shock hazard and the insulation stresses and the inherent possibility of a short circuit. Under these conditions the reliability of an ungrounded system is severely reduced.

By superimposing an additional signal on the suspect power line, it is possible to trace and locate the ground fault. At the fault the entire tracing signal disappears since it returns through the ground to its source so that at any location further from the source or point of injection the absence of the signal is immediately discerned. Even this system, although simple and direct, cannot be employed under all circumstances, as, for example, in a distribution system where there exist multiple and congested wireways and structures which thereby radiate and become the sources of complex signals and variable field patterns.

It is an object of this invention to provide a simple, inexpensive, reliable and easily employed method and apparatus for the detection and location of ground faults in an ungrounded electrical system.

A further object is to provide a ground fault detection and location apparatus which is operable to distinguish and locate a ground among the cables of a multiple wireway without disturbing the cables.

Another object of this invention is to provide a ground fault locator which is limited in its current output and which may not be initially operable unless its output be below a selectable amplitude.

Other objects and advantages will appear from the following description of an example of the invention, and the novel features will be particularly pointed out in the appended claims.

Figure 1:
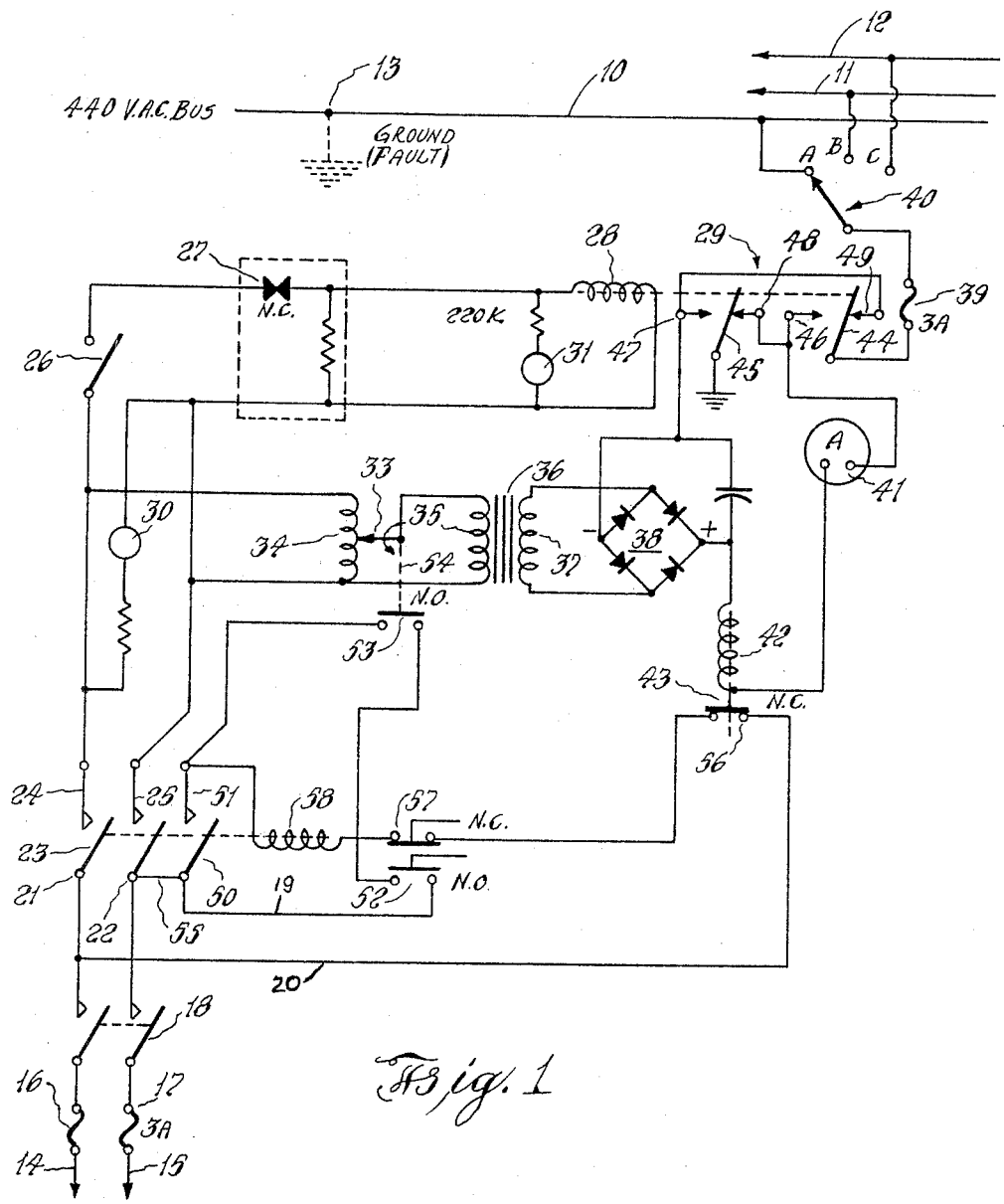
FIG. 1 is a wiring diagram of a circuit embodiment of a signal source made in accordance with the principle of this invention.

In the embodiment of the invention illustrated in FIG. 1, three feeder lines 10, 11 and 12 of a power distribution system (source not shown) as for example, a three phase 440 v. A.C. are energized operative aboard a ship. One of the lines, say 10, is grounded by way of defective insulation as represented at 13. Without considering, for the moment, the method by which a determination is made as to the existence of such a ground fault, it would be a simple matter to open circuit this line at various points and determine whether in each case the ground fault was still present and thereby ascertain its location. On the other hand, it is desirable to locate such a fault without the expenditure of needless time and energy or to open-circuit the line. In this regard, the apparatus embodying the inventive concept is now to be described.

A source of electrical energy (not shown) supplies 120 volt alternating current to lines 14 and 15 which are provided with fuses 16 and 17 and a double pole-single throw switch 18. These lines divide into two separate parallel paths, one being lines 19, 20 and the other the movable poles 21, 22 of triple pole-single throw relay operated switch 23. The opposite fixed contacts 24, 25 of switch 23 are connected in a series path which includes a single pole-single throw pulsing switch 26, a thermal relay 27 and the coil 28 of a double pole-double throw relay switch 29. A pair of neon light indicators 30, 31 are connected respectively across the coil 28 and the fixed contact, that is one on either side of the pulse switch 26. Disposed across contacts 24, 25 is variable transformer 32 or a Variac (trade name of General Radio Co.) whose movable slide arm 33 and one end of the winding 34 are across the winding 35 of a step-down isolation transformer 36. The secondary winding 37 of the isolation transformer supplies alternating current to full wave bridge rectifier 38 while the output path thereof includes the contact portion of switch 29, fuse 39, phase selector 40, ammeter 41 and coil 42 of relay 43.

Disregarding for the present the safety and overload circuitry and assuming that both switches 18 and 23 are closed, then by closing pulse switch 26 the thermal relay 27 is energized. This relay in its most elemental configuration is a time controlled switch which periodically opens and closes due to the heating and cooling of its elements. Normally without energization the relay is closed so that when the above switches are closed, current immediately flows through coil 28 and the relay armature is displaced from its rest position carrying with it movable arms 44, 45 and placing them into contact with stationary terminals 46, 47. The negative side of the bridge rectifier is grounded through contact 47 and arm 45 while the positive side is applied by way of arm 44 and contact 46 to line 10. After a period of time the thermal relay element is sufficiently heated to open the circuit and permit the relay 29 to return to its initial or rest position (arm 45 contacting 48 and arm 44 contacting 49) as shown reversing the polarity on the line 10. Clearly as the thermal relay 27 changes its state the potential applied to the line or cable changes from one polarity to the other. Satisfactory results have been obtained where the duration for each polarity is approximately one-half to one second or stated in another way, the period of the square wave applied to the suspect cable is approximately one to two seconds.

Pole 50 and fixed contact 51 of switch 23 are series connected and contain in that path normally open push button switch 52, normally open switch 53 which is coupled to the shaft 54 of Variac arm 33 so that the switch is closed only when the Variac arm is in the position of lowest or zero voltage. Poles 22 and 50 are tied together by line 55. Another series path exists between pole 21 and stationary contact 51 which path includes, the normally closed contacts 56 of overload relay 43, normally closed push button switch 57 and coil 58 of relay operated switch 23.

*Operation*

Having described in detail the circuit embodiment it remains to illustrate the operation thereof. Initially switch 18 is closed and a combined series path is energized which may be traced as follows: pole 21, closed contacts 56, 57, coil 58, fixed contact 51, contacts 53 but only if Variac slide 33 is at its lowest output setting, normally open start push button 52, line 55 and fixed contact 22. With the closing of the start button the loop is completed and current flows through coil 58 thereby closing switch 23. The start push button switch 52 only momentarily completes the circuit but this is of sufficient time to allow the activation of switch 23. The closing of this switch now completes another circuit which does not include the start switch so that coil 58 remains energized irrespective of the start button switch position. This second or other circuit includes contact 21, contacts 56, normally closed push button switch 57, coil 58, fixed contact 51, pole 50, line 55 and finally contact 22 thereby holding switch 23 in its contacting or closed position.

Since switch 23 remains closed, the winding 34 is energized and by rotating the shaft of the Variac to produce an output at transformer 36, the rectifier bridge 38 then supplies a D.C. output to the line being examined. That portion of the protective or safety circuitry which includes switch 53 insures that initially the current output of the rectifier will be a minimum, independent of the impedance of the ground. Thereafter, the current, through the line being examined, also flows in coil 42 and should this current exceed some predetermined value, normally closed contacts 56 will open, and the holding current through coil 58 will be interrupted, thereby causing switch 23 to open and in effect de-energizing the entire circuit.

With switch 23 and pulse switch 26 closed, the full supply voltage appears across relay coil 28, thereby resulting in a particular voltage polarity to be impressed on line 10. After a short period of time depending on the physical structure of the thermal relay 27, the circuit is interrupted thereby displacing the relay 29 contacts so that the opposite polarity now appears at the line 10. This process is repeated and for most purposes a square wave-type of output is generated at the line 10. A period of approximately one to two seconds has been found to be quite satisfactory although variation of the period to some extent is possible.

Figure 2:
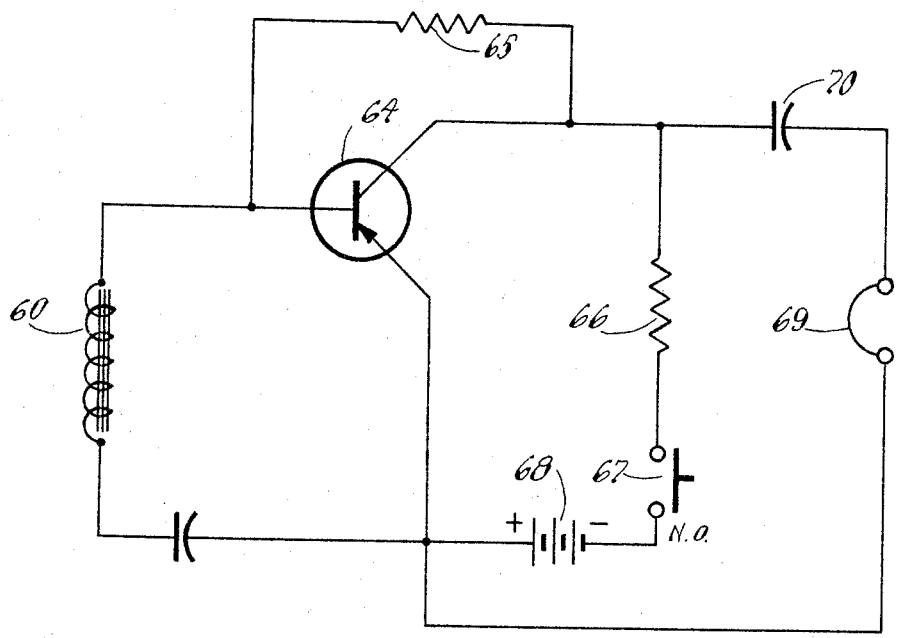
FIG. 2 is a wiring diagram of a detection circuit which may be employed in conjunction with the signal source to locate a ground fault.
Figure 3:
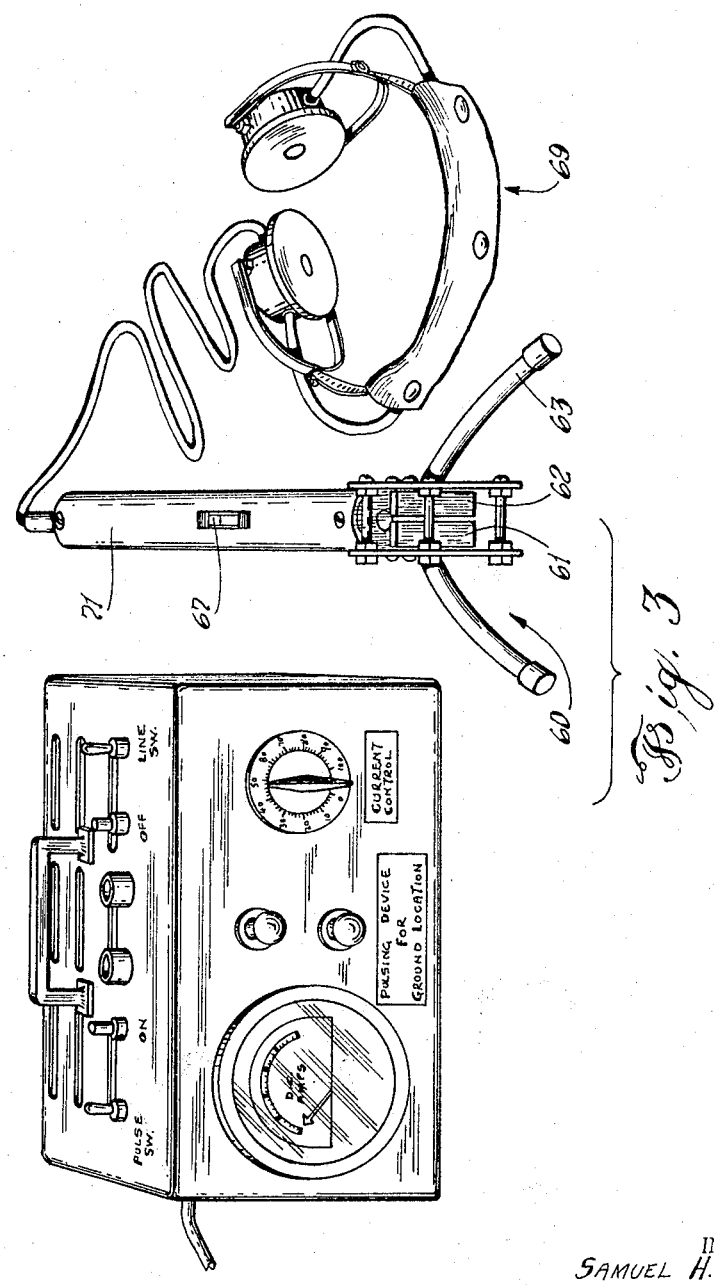
FIG. 3 is a perspective illustration of both the signal source and the detection apparatus.

FIGS. 2 and 3 illustrate one possible detection apparatus which may be employed to monitor the subject line to which has been applied the above-described square wave. A search coil 60 which includes a pair of coils 61, 62 series mounted on a forked iron core 63, is arranged to apply its output to a transistor 64 which with its associated components base-collector resistor 65 and collector-emitter resistor 66 forms an audio amplifier. A push button switch 67 connects the power supply, which, in this case, is a battery 68 for portability, to the amplifier circuit. The output of the transistor audio amplifier is applied across headphones 69 by way of capacitor 70. The entire circuit is confined in a compact housing 71 with switch 67 readily accessible.

With the square-wave being continually applied to a suspect line, the search coil is moved along and proximate the line while the operator listens for the "clicks" resulting from the change of polarity of the current being applied. The coil senses the change in magnetic flux around the line caused by the changing current therein. The detection or searching commences at the point at which the square-wave is introduced and proceeds toward the opposite extremity. As long as the "clicks" can be detected, the search coil is advanced. Once the "clicks" disappear, it is then known that the ground fault exists at some point between the last location at which they were observed and the present location. If there are branch circuits therebetween, then the same procedure is followed for each of the branches. Clearly this method and probably others presently in use are adaptable to lines and wires which are separate and apart from each other but where the lines are all carried in one wireway it becomes extremely difficult to detect the input signal since the inherent noise level in a multitude of cables is quite high. The present subject method and apparatus solves this problem and permits measurements under conditions previously impossible. The type of detection signal, its generation and detection contribute to provide positive ground fault location. Additionally, the problem becomes multiplied where the power lines are 400 cycles and above. Here considerable audio hum is radiated by the cable and prior detectors are incapable of distinguishing this hum from any other signal. My invention on the other hand is capable of easily detecting the "signature" of the clicks.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A ground fault locator device for use on an undergrounded electrical system including several conductor wires comprising:
   (a) a relay having a coil and a triple pole-single throw switch said TP–ST switch having first, second and third poles and first, second and third stationary contacts, said second and third poles being electrically connected,
   (b) a source of A.C. connected across said first and second of said poles of said TP–ST switch,
   (c) a second relay having a coil and a double pole-double throw switch,
   (d) a thermal relay for alternately opening and shorting circuiting a line in which it is placed,
   (e) a first series circuit path having included therein said thermal contactor, said first and second stationary contacts of said TP–ST switch, said coil of said second relay,
   (f) a normally open start switch,
   (g) a second series path having included therein said first pole of said TP–ST switch, said coil of said TP–ST switch, said third stationary contact of said TP–ST switch, said start switch, said third pole of said TP–ST switch,
   (h) rectifier means having its input connected across said first and second stationary contacts and its output connected across paralleled stationary contacts of said DP–DT switch,
   (i) one of the poles of said DP–DT switch being grounded and the other pole provided with connection means to a wire of said electrical system along which a ground is to be located,
   (j) detector means movable along a wire for detecting the changing polarity current in said wire so the ground fault can be located.

2. The device according to claim 1 further including:
(a) a current overload relay having a coil and a pair of contacts operable by said coil,
(b) said contacts in series in said second series path,
(c) said coil in series connection with said output of said rectifier.

3. The device according to claim 2, further including:
(a) a normally closed stop switch in series connection in said second path.

4. The device according to claim 3, further including:
(a) a variable transformer having a winding and a tap movable therealong to vary the output voltage of said transformer,
(b) a normally open safety switch,
(c) switch coupling means coupling the movement of said tap with said switch whereby said switch is closed only when said tap is positioned for a minimum output voltage,
(d) said transformer interposed between said first and second stationary contacts and said rectifier means,
(e) said safety switch in series connection in said second path.

References Cited by the Examiner

UNITED STATES PATENTS

| | | | |
|---|---|---|---|
| 2,199,846 | 5/1940 | Borden | 324—52 |
| 2,641,633 | 6/1953 | Hosford | 324—52 |
| 2,698,921 | 1/1955 | Wharton | 324—52 |
| 2,932,791 | 4/1960 | Carrington | 324—51 X |
| 2,988,691 | 6/1961 | McAlister | 321—2 X |
| 2,993,167 | 7/1961 | Smith | 324—52 |

OTHER REFERENCES

Locating Underground Cable Faults, Electrical World, 86 (26): p. 1297–1300. Dec. 26, 1925.

Benson et al.: Buried Cable Faults Located by Sonic Detector, Electrical World, p. 82–85, June 22, 1946.

WALTER L. CARLSON, *Primary Examiner.*

G. R. STRECKER, *Assistant Examiner.*